United States Patent
Wheat et al.

(10) Patent No.: US 7,442,456 B2
(45) Date of Patent: Oct. 28, 2008

(54) CURRENT CONTROL FOR PARALLEL FUEL CELL STACKS

(75) Inventors: John S Wheat, Rochester, NY (US); Clark Hochgraf, Rochester, NY (US); Daryl Chapman, Victor, NY (US)

(73) Assignee: General Motors Corporation, Detroit, MI (US)

( * ) Notice: Subject to any disclaimer, the term of this patent is extended or adjusted under 35 U.S.C. 154(b) by 310 days.

(21) Appl. No.: 10/762,656

(22) Filed: Jan. 22, 2004

(65) Prior Publication Data

US 2005/0164048 A1    Jul. 28, 2005

(51) Int. Cl.
    *H01M 8/04*    (2006.01)
(52) U.S. Cl. .............. 429/23; 428/13; 428/22; 428/24; 428/25
(58) Field of Classification Search .......... 429/23
    See application file for complete search history.

(56) References Cited

U.S. PATENT DOCUMENTS 6,461,751 B1 *   10/2002   Boehm et al. ............... 429/13
2001/0049038 A1 * 12/2001  Dickman et al. ............ 429/19

FOREIGN PATENT DOCUMENTS

JP    06-267577    *   9/1994
JP    2003-243008  *   8/2003

* cited by examiner

*Primary Examiner*—Jonathan Crepeau
*Assistant Examiner*—Tony Chuo

(57) ABSTRACT

A fuel cell system includes fuel cell stacks electrically connected in parallel and supplying a gross current to a load. A controller determines the gross load current, and produces a desired current through the load by adjusting, based on the gross load current, at least one parameter affecting at least one of the inputs to and outputs from the system. This system allows a stack design and its voltage output to be kept constant while stacks are added for increased power.

38 Claims, 3 Drawing Sheets

CURRENT CONTROL FOR PARALLEL FUEL CELL STACKS

FIELD OF THE INVENTION

The present invention relates to fuel cells and, more particularly, to controlling current shared among a plurality of fuel cells.

BACKGROUND OF THE INVENTION

Fuel cells produce electricity through electrochemical reaction and have been used as power sources in many applications. Fuel cells can offer significant benefits over other sources of electrical energy, such as improved efficiency, reliability, durability, cost and environmental benefits. Fuel cells may eventually be used in automobiles and trucks. Fuel cells may also power homes and businesses.

There are several different types of fuel cells, each having advantages that may make them particularly suited to given applications. One type is the proton exchange membrane (PEM) fuel cell, which has a membrane sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). Because the membrane is proton conductive, the protons are transported through the membrane. The electrons flow through an electrical load that is connected across the electrodes. In a second half-cell reaction, oxygen ($O_2$) at the cathode reacts with protons ($H^+$) and electrons ($e^-$) are taken up to form water ($H_2O$).

In fuel cell applications, a plurality of fuel cells are combined in series to form one or more stacks. Power demands of different fuel cell applications vary. Changing the active area of the fuel cell in a stack can scale power. This approach, however, requires fuel cells to be redesigned and/or retooled for the different power levels, which is a costly approach.

Other ways of scaling the power output of fuel cell stacks include varying the number of cells in a stack and/or connecting stacks in series. When changing stack output voltages, it is usually necessary to redesign supporting components such as compressors. When stacks are connected in series to allow power scaling, different output voltages are produced, which complicates the design of accessory loads and electrical interfaces.

SUMMARY OF THE INVENTION

A fuel cell system according to one embodiment of the present invention includes a plurality of fuel cell stacks connected in parallel and supplying a gross current to a load. The system has a plurality of inputs to and a plurality of outputs from the stacks. A controller produces a desired current through the load by adjusting, based on the gross load current, at least one parameter affecting at least one of the inputs and outputs.

In another embodiment, a fuel cell system includes a plurality of fuel cell stacks electrically connected in parallel to supply a load. Each stack includes a plurality of inputs and outputs affected by a plurality of parameters. A controller determines a current from one of the stacks to the load, and, based on the determined current, adjusts at least one of the parameters to produce a desired current through the load.

An embodiment of a method for controlling power to a load supplied by a plurality of fuel cells includes combining the fuel cells to provide a plurality of fuel cell stacks. The method further includes connecting the stacks in parallel, and controlling at least one of an input to and an output from a given stack to provide a desired current through the given stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
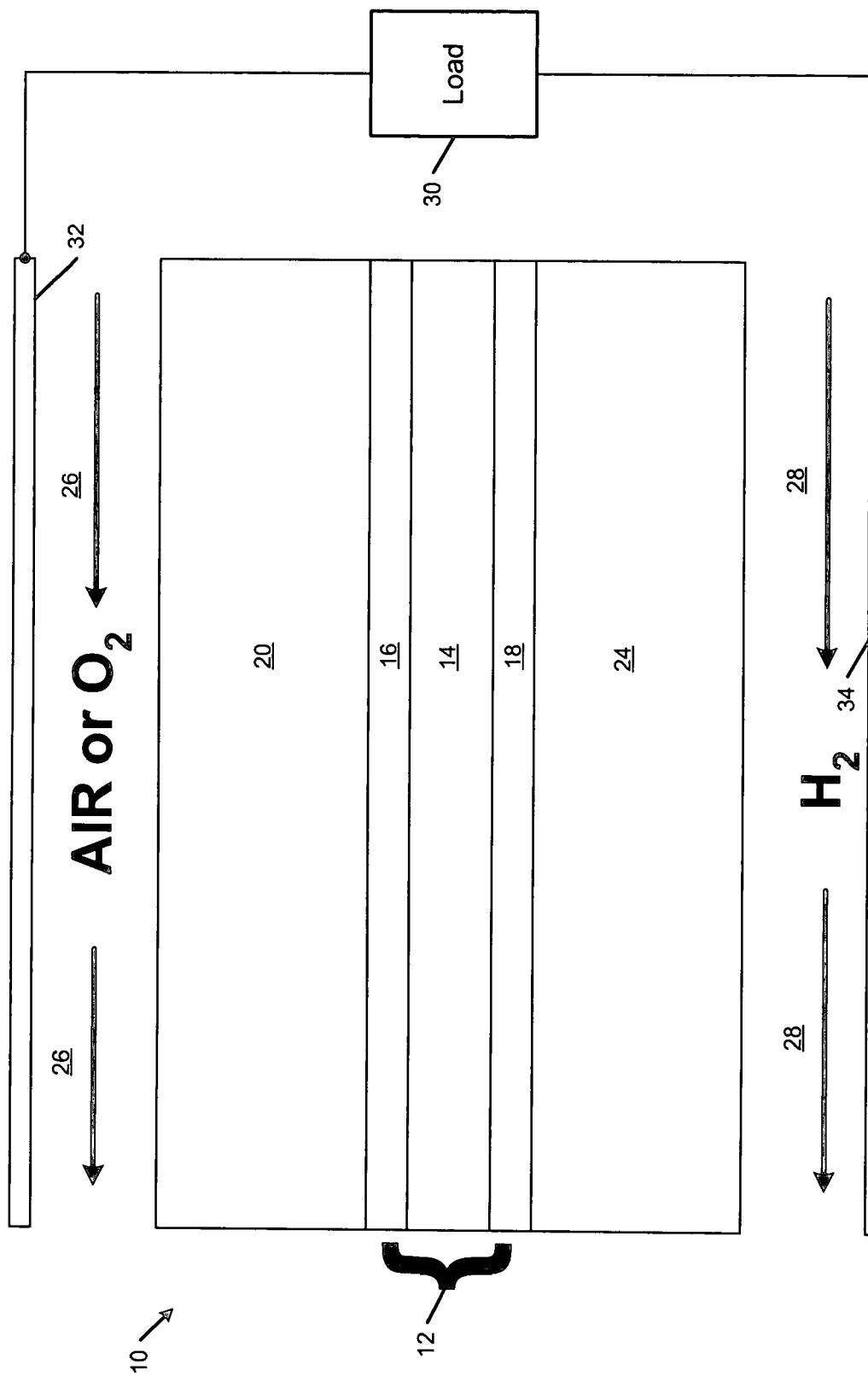
FIG. 1 illustrates a cross-section of a membrane electrode assembly (MEA) of a fuel cell.

Referring now to FIG. 1, the present invention will be described in conjunction with a fuel cell 10 that includes a membrane electrode assembly (MEA) 12. Skilled artisans will appreciate that other types of fuel cells are contemplated and may be employed without departing from the invention. Preferably, the MEA 12 is a proton exchange membrane (PEM). The MEA 12 includes a membrane 14, a cathode 16, and an anode 18. The membrane 14 is sandwiched between the cathode 16 and the anode 18.

A cathode diffusion medium 20 is layered adjacent to the cathode 16 opposite the membrane 14. An anode diffusion medium 24 is layered adjacent to the anode 18 opposite the membrane 14. The fuel cell assembly 10 further includes a cathode flow channel 26 and anode flow channel 28. The cathode flow channel 26 receives and directs air or oxygen ($O_2$) from a source to the cathode diffusion medium 20. The anode flow channel 28 receives and directs hydrogen ($H_2$) from a source to the anode diffusion medium 24.

In the fuel cell assembly 10, the membrane 14 is a cation permeable, proton conductive membrane having $H^+$ ions as the mobile ion. The fuel gas is hydrogen ($H_2$) and the oxidant is oxygen or air ($O_2$). The overall cell reaction is the oxidation of hydrogen to water and the respective reactions at the anode 18 and the cathode 16 are as follows:

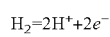

$$H_2 = 2H^+ + 2e^-$$

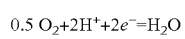

$$0.5\,O_2 + 2H^+ + 2e^- = H_2O$$

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner.

The cell reaction produces a proton exchange in a direction from the anode diffusion medium 24 towards the cathode diffusion medium 20. In this manner, the fuel cell assembly 10 produces electricity. An electrical load 30 is electrically connected across a first plate 32 and a second plate 34 of the MEA 12 to receive the electricity. The plates 32 and/or 34 are bipolar plates if a fuel cell is located adjacent to the respective plate 32 or 34 or end plates if a fuel cell is not adjacent thereto.

Figure 2:
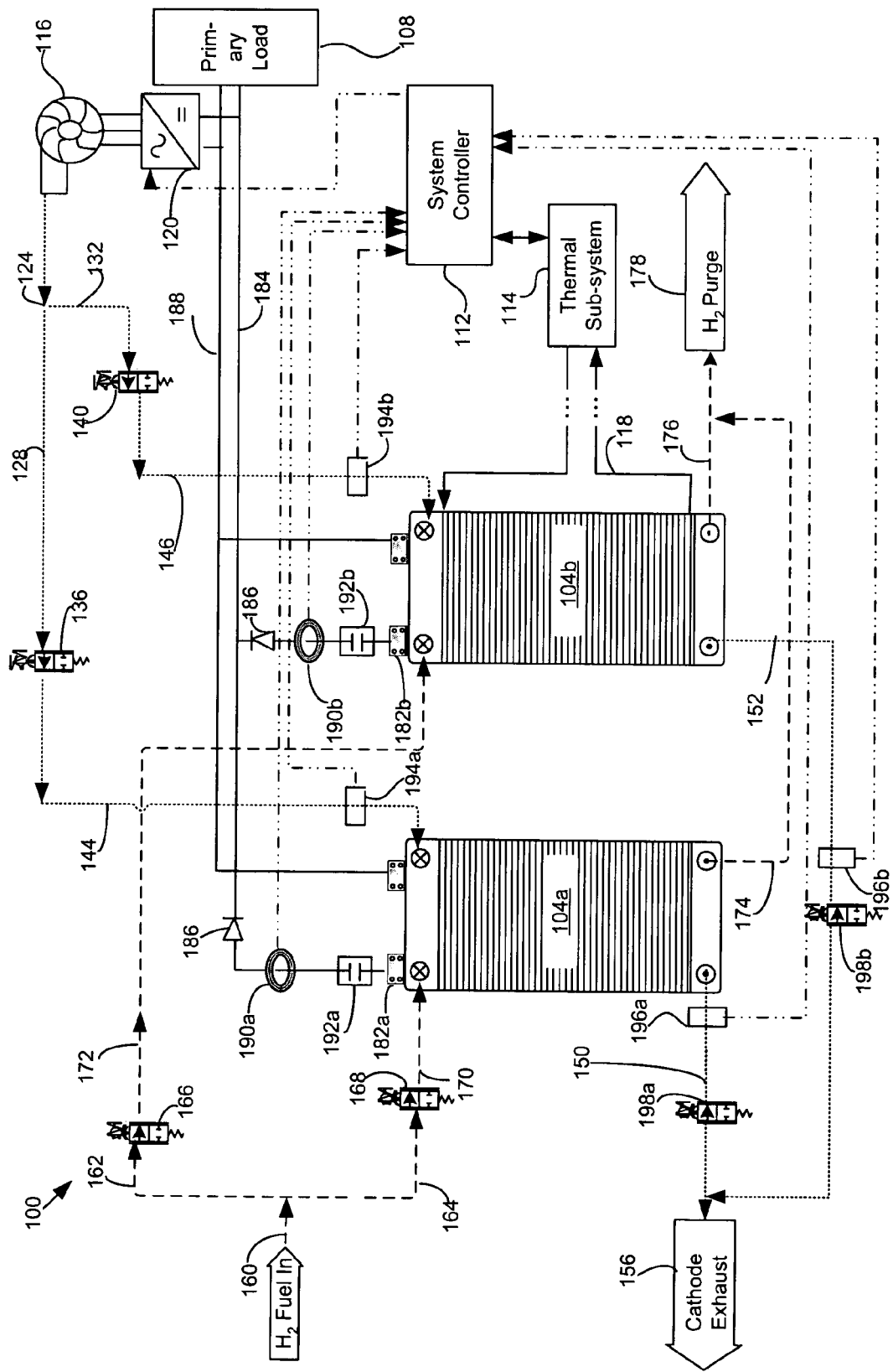
FIG. 2 is a diagram of a fuel cell system according to one embodiment of the present invention.

Referring now to FIG. 2, a fuel cell system according to one embodiment is indicated generally by reference number 100. The system 100 includes a plurality of fuel cell stacks 104 electrically connected in parallel and providing a gross load current to a primary load 108 and an ancillary load, e.g., a cathode compressor motor assembly 116. Two fuel cell stacks 104a and 104b are included in the embodiment shown in FIG. 2, although more than two stacks are contemplated in other embodiments. Generally, electrically connecting fuel cell stacks 104 in parallel fixes an output voltage range. Power-producing capacity can be increased by adding parallel stack(s) 104 to the system 100. When a plurality of stacks 104 are operated in parallel, a resulting parallel bus voltage generated from the parallel configuration is matched by all the stacks 104 in the parallel configuration, in accordance with Kirchhoff's voltage law.

When the fuel cell stacks 104 are connected in parallel, current produced by a given stack 104 may differ significantly from other connected stacks 104. Such difference may be due in part to variability in stack material, build process, operating flows and other normal variations. In order to minimize stack degradation, maximize power output, and maximize efficiency, it is desirable to independently control the currents produced by each stack 104 at or close to a desired set point to achieve operating conditions appropriate for each stack 104. Although current controls might be provided using power conversion electronics, such controls could add considerable cost, mass and volume to the system 100.

Therefore, in the present embodiment and as further described below, a system controller 112 is configured to produce a desired current across the loads 108 and 116 by adjusting, based on the gross load current, at least one parameter affecting at least one input to and/or output from at least one of the stacks 104. Such parameters include but are not limited to pressure, humidity, stoichiometry, nitrogen dilution and temperature. Thus current generated by a stack 104 can be controlled and varied, for example, by controlling the anode and/or cathode gas streams for that stack, as further described below. The system 100 can control stack currents independently of one another and to different levels, for example, based on different stack current set points in proportion to the active areas of the stacks 104.

In the fuel cell system 100, cathode reactions are processed in the following manner. A cathode compressor 116 is powered by the stacks 104 and controlled by the system controller 112 via a DC/AC converter 120. Oxidant is drawn from atmospheric pressure through the cathode compressor 116. The oxidant is discharged at positive pressure from the cathode compressor 116 into a common cathode inlet manifold 124. The oxidant is forced into cathode distribution inlets 128 and 132. Mass flow of the oxidant is controlled via cathode inlet control valves 136 and 140. The regulated oxidant mass flows are forced into cathode inlet streams 144 and 146 respectively for the fuel cell stacks 104a and 104b. Upon completing a proton exchange reaction, waste oxidant gases are exhausted via cathode exhaust distribution outlets 150 and 152, in which are respectively positioned back-pressure control valves 198a and 198b. The oxidant waste gases are combined in a common cathode exhaust stream 156.

Anode reactions are processed in the following manner. Pressurized hydrogen enters an anode common inlet manifold 160 and is forced into anode distribution inlets 162 and 164. Mass flow of the respective hydrogen streams is controlled via anode inlet control valves 166 and 168. Regulated hydrogen mass flows are forced into anode inlet streams 170 and 172 for the fuel cell stacks 104a and 104b respectively. Upon completing a proton exchange reaction, waste anode gases are exhausted via anode exhaust distribution outlets 174 and 176. Anode waste gases are combined in a common anode exhaust stream 178.

The stacks 104 generate electricity in the following manner. Electrons generated by proton exchange reactions within each fuel cell stack 104 are collected at negative electrical terminals 182a and 182b. Current is conducted via a system negative voltage bus 184 through optional diodes 186 to serve the cathode compressor motor assembly 116 and the primary system load 108. Return currents are conducted via a positive voltage bus 188. The fuel cell stacks 104a and 104b are electrically connected in parallel. Thus voltages across each of the stacks are equal. Electrons are produced at a rate at least partly determined by cathode and anode gas mass flow rates through the cathode and anode inlet streams 144 and 170 for fuel cell stack 104a, and streams 146 and 172 for fuel cell stack 104b.

Currents generated by the fuel cell stacks 104a and 104b are measured respectively by current sensors 190a and 190b, which are in electrical communication with the controller 112. The controller 112 monitors the current sensors 190 and uses current information for each stack 104 to determine a total (i.e., gross) load current generated by the stacks 104a and 104b. Alternatively or additionally, the controller 112 uses oxygen sensors 194 and 196 to determine the gross current generated by the stacks 104a and 104b. For example, the sensor 194a monitors oxygen content of the cathode inlet stream 144 to the stack 104a. The sensor 196a monitors oxygen content of the cathode exhaust distribution outlet 150. The controller 112 uses information from the sensors 194a and 196a to determine oxygen consumption across the stack 104a. The controller 112 uses the oxygen consumption across the stack 104a to determine current generated by the stack 104a. Thus, although both current sensors and oxygen sensors are illustrated in FIG. 2, embodiments are contemplated in which oxygen sensors are not included, and other embodiments are contemplated in which current sensors are not included. Although a controller may calculate (rather than sense) current values from oxygen sensor information, oxygen sensors may be less expensive than current sensors.

Stack temperatures and relative humidity can be controlled via on or more thermal subsystems 114 in communication with the controller 112. For simplicity, only one thermal subsystem 114 is shown in FIG. 2, and only one stack 104 is shown connected to the thermal subsystem 114. However, each stack 104 preferably would be configured with a thermal subsystem. It also is contemplated that a single thermal subsystem 114 could provide cooling for all of the stacks 104. The controller 112 can adjust stack temperatures, for example, by controlling the circulation of coolant through a coolant loop 118 in a stack 104. The thermal subsystem 114 is configured to communicate information to the controller 112 pertaining, for example, to stack temperature, radiator temperature, bypass valve position, coolant pump motor speed, and radiator fan speed. The controller 112 can use such information, for example, to control the pumping and flow of coolant through the thermal subsystem 114 and the stacks 104.

The controller 112 uses the gross load current to set a gross cathode stream mass flow rate through the compressor 116. The controller 112 generates a total cathode and anode mass flow control set point to obtain a desired total current generation for serving the primary system load 108 and the cathode compressor motor assembly 116. One or more parameters affecting a particular stack 104 can be adjusted, for example, according to applicable parameter relationships, to control current produced by the particular stack 104.

Figure 3:
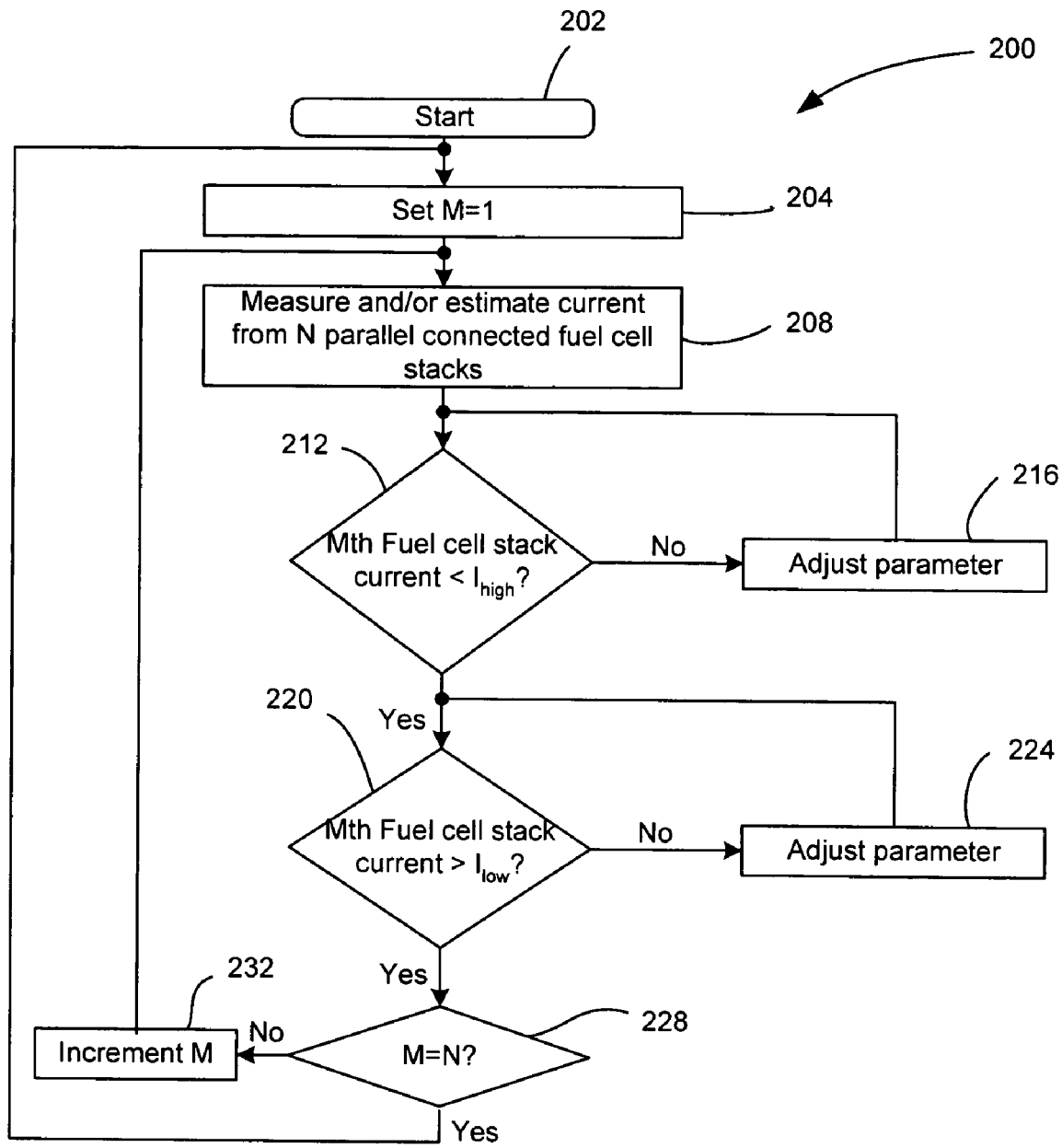
FIG. 3 is a flow diagram illustrating an embodiment of a controller-performed method for adjusting one or more parameters affecting fuel cell stacks.

An embodiment of a method performed by the controller 112 for adjusting one or more parameters affecting the stacks 104 is indicated generally in FIG. 3 by reference number 200. The controller 112 starts at step 202 and sets a stack index M equal to 1 at step 204. At step 208 the controller 112 measures and/or estimates current at each of N parallel-connected, operating fuel cell stacks 104. If at step 212 the controller determines that current through a fuel cell stack corresponding to index value M ("the Mth stack") exceeds an upper threshold current value $I_{high}$, the controller at step 216 adjusts at least one parameter affecting the Mth stack and checks the Mth stack current again at step 212. If at step 220 current through the Mth stack is less than $I_{high}$ but not greater than a lower threshold current value $I_{low}$, the controller at step 224 adjusts at least one parameter affecting the Mth stack and checks the stack current again at step 220.

If current through the Mth stack falls between $I_{high}$ and $I_{low}$ and M does not equal N at step 228, then the controller 112 increments the index M, e.g., by one, and control returns to step 208. At step 208 the controller 112 measures and/or estimates current from the N stacks 104 and proceeds to step 212 to check current through a stack corresponding to index value M+1. If M equals N at step 228, control returns to step 204, M is reset to 1, and so on.

One or more parameters affecting the stack(s) 104 can be adjusted in a plurality of ways. For example, a proportion of oxidant to hydrogen to a particular stack 104 can be adjusted to drive the load current for that stack to a desired value. Thus, using the anode and cathode mass flow control valves 168 and 136, the system controller 112 can adjust stack 104a stoichiometry and/or gas pressure(s) to set and control an amount of current generated from fuel cell stack 104a. Using the anode and cathode mass flow control valves 166 and 140, the system controller 112 can set and control an amount of current generated from fuel cell stack 104b. Relative humidity in a stream is affected, for example, by pressure. Accordingly, relative humidity of a cathode stream of stack(s) 104 can be adjusted in the system 100 via back-pressure control valves 198a and/or 198b.

Embodiments are contemplated wherein stack 104 anode exhaust streams 174 and/or 176 are re-circulated through the system 100, possibly resulting at times in nitrogen accumulation in stack cells 10. The controller 112 can detect the foregoing condition, known as nitrogen dilution, by monitoring voltages across the stacks 104. Where the controller 112 determines that stack voltages have dropped due to nitrogen dilution, the exhaust streams 174 and/or 176 are vented and fresh hydrogen input is introduced at the anode common inlet manifold 160.

The diodes 186 are optional for protecting stacks 104 against reverse bus currents. A given stack 104 can be electrically isolated from the system 100 by opening a contactor 192a or 192b connected between the given stack terminal 182 and the bus 184. Thus a selected stack can be switched in and/or out of the fuel cell system 100 as may be desired, while other stack(s) 104 may be kept in operation. In an embodiment having more than two stacks, more than one stack 104 may be de-energized at any one time. Voltage may vary with current, for example, according to a polarization curve which is a function of controlled parameters, design and fuel cell behavior.

In the present embodiment, an amount of power being generated by the system 100 can be changed by adding stacks 104 to the system 100 and/or taking stacks out of the system 100. Where the stacks 104 are of a standard size, e.g., having equal numbers of fuel cells and common or differing active areas, the power can be changed by discrete amounts related to the stack size. The power produced from each of the stacks 104 of the system 100 can be tuned, i.e., balanced, within a fixed bus voltage range, by control of parameters as previously described.

The foregoing system and related methods make it possible to keep a stack design and its voltage output constant while adding one or more stacks to produce higher amounts of current. Where stacks are combined to form fuel cell power modules for a particular application, paralleling of modules is beneficial because the application voltage remains the same as the power level increases. Embodiments of the present invention allow current in each stack to be controlled. Such control can be adapted for degradation of an individual stack over its life. A comparatively less stable stack can be allowed to operate at a comparatively low operating point. In the event of loss of an individual stack, although total output power may be reduced, the foregoing system can remain in operation. Thus reliability, flexibility and efficiency of a fuel cell system are increased where such system is configured in accordance with the foregoing embodiments.

Power levels can be scaled in the foregoing system without having to change the size of an active cell area. Common voltages can be provided for accessory components, for example, for a compressor and/or an isolation detection system. Parallel electrical operation of fuel cell stacks and modules is achieved without costly power electronics.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
a plurality of fuel cell stacks connected in parallel, each of said stacks supplying one of a plurality of currents for a load;
a plurality of inputs to and a plurality of outputs from each of said stacks that affect respective ones of said plurality of currents; and
a controller that produces a desired current through said load by adjusting ones of said currents in a predetermined sequence,
wherein said controller adjusts said currents by adjusting at least one parameter affecting at least one of said inputs and outputs.

2. The fuel cell system of claim 1 wherein said controller adjusts at least one of an anode input, an anode output, a cathode input and a cathode output.

3. The fuel cell system of claim 1 wherein the at least one parameter comprises at least one of pressure, humidity, stoichiometry, nitrogen dilution and temperature.

4. The fuel cell system of claim 1 wherein said stacks include equal pluralities of cells.

5. The fuel cell system of claim 1 wherein said controller controls a first current through a first of said stacks and a second current through a second of said stacks, the second current controlled independently of the first current.

6. The fuel cell system of claim 5 wherein said controller controls the first and second currents based on set points proportional to active areas of said first and second stacks.

7. The fuel cell system of claim 1 further comprising a contactor connected between one of said stacks and the load.

8. The fuel cell system of claim 1 further comprising a current sensor that senses a current generated by one or more of said stacks;
wherein said controller uses said sensed current to determine a gross load current.

9. The fuel cell system of claim 8 wherein said controller uses said gross load current to determine a gross cathode stream mass flow rate.

10. The fuel cell system of claim 1 further comprising a pair of oxygen sensors that sense oxygen consumption by one or more of said stacks;
wherein said controller uses said sensed oxygen consumption to determine said gross load current.

11. The fuel cell system of claim 1 wherein a total power is adjusted by adjusting the plurality of parallel stacks.

12. A fuel cell system comprising:
a plurality of fuel cell stacks electrically connected in parallel, each of said stacks supplying one of a plurality of currents, which collectively supply a gross load current to a load, each stack comprising a plurality of inputs and outputs that are affected by a plurality of parameters; and
a controller that produces a desired current through said load by adjusting selected ones of said currents in a predetermined sequence until each of said currents is less than an upper threshold and greater than a lower threshold.

13. The fuel cell system of claim 12 wherein said controller produces a desired current from at least one of said stacks to the load.

14. The fuel cell system of claim 12 wherein said parameters comprises at least one of pressure, humidity, stoichiometry, nitrogen dilution and temperature.

15. The fuel cell system of claim 12 wherein said controller adjusts at least one of an anode input, an anode output, a cathode input and a cathode output.

16. The fuel cell system of claim 12 wherein said controller determines the gross load current using said currents, and balances said inputs based on the gross load current.

17. The fuel cell system of claim 12 wherein said controller determines the gross load current using said currents, and balances said selected ones of said currents based on the gross load current.

18. A method for controlling current to a load supplied by a plurality of fuel cells, comprising:
combining the fuel cells to provide a plurality of fuel cell stacks, each fuel cell stack providing one of a plurality of currents to a load;
connecting the stacks in parallel; and
adjusting ones of said currents in a predetermined sequence until each of said currents is less than an upper threshold and greater than a lower threshold,
wherein said adjusting comprises adjusting at least one parameter affecting said ones of said currents.

19. The method of claim 18 further comprising using said ones of said currents to provide a desired current to the load.

20. The method of claim 18 further comprising combining the fuel cells to provide stacks having equal pluralities of cells.

21. The method of claim 18 wherein said at least one parameter comprises at least one of pressure, humidity, stoichiometry, nitrogen dilution and temperature.

22. The method of claim 18 wherein adjusting one of said currents comprises adjusting at least one of an anode input and a cathode input.

23. The method of claim 18 wherein adjusting one of said currents comprises:
determining a stack load current through at least one of the stacks;
determining the desired current through the given stack using the determined stack load current; and
adjusting said one of said currents based on said desired current.

24. The method of claim 18 wherein adjusting one of said currents comprises:
determining oxygen consumption across the given stack; and
determining the desired current through the given stack using said determined oxygen consumption; and
adjusting said one of said currents based on said desired current.

25. The method of claim 24 wherein said determining oxygen consumption comprises determining oxygen concentrations in a cathode inlet and outlet.

26. The method of claim 18 wherein controlling at least one of an input to and an output from a given stack comprises:
using said gross load current to determine a gross cathode stream mass flow rate.

27. The method of claim 18 further comprising controlling at least one input to a given stack to eliminate a current through the given stack.

28. The method of claim 18 further comprising controlling at least one input to a plurality of said stacks to control a plurality of currents through said plurality of stacks.

29. The method of claim 18 further comprising changing the plurality of parallel stacks to change power to the load.

30. A method for controlling current to a load supplied by a plurality of fuel cells, comprising:
combining the fuel cells to provide a plurality of fuel cell stacks, each of said stacks having a standard number of cells;
electrically connecting said stacks in parallel to provide a standard voltage range across each of said stacks;
obtaining desired set-points for current from each of said stacks; and
providing a desired current through said load by adjusting ones of said currents in a predetermined sequence until each of said currents reach a respective set-point;
said obtaining and regulating performed by controlling at least one of a plurality of parameters affecting at least one of an input to and an output from at least one said stack.

31. The method of claim 30 further comprising:
determining a gross current through said load; and
balancing currents from the stacks based on said determined gross load current.

32. The method of claim 30 wherein said respective set point for current from one of the stacks is proportional to an active area of the one of the stacks.

33. A method for controlling current to a load supplied by a plurality of fuel cells, comprising:
combining the fuel cells to provide a plurality of fuel cell stacks;
electrically connecting said stacks in parallel;
determining a gross current to the load; and
balancing currents produced by said stacks in a predetermined sequence and based on said gross load current to provide a desired load current,
said balancing performed by adjusting one or more parameters affecting at least one of an input to and an output from at least one of said stacks for each of the stacks individually.

34. The method of claim 33 further comprising determining an oxygen consumption level in a stack to determine a current level across the stack.

35. The method of claim 34 wherein determining an oxygen consumption level comprises comparing oxygen concentrations in a cathode inlet and outlet.

36. The method of claim 33 wherein balancing currents produced by said stacks comprises determining a current through a stack to the load.

37. The method of claim 36 wherein said determining a current is performed using one of a current sensor and an oxygen sensor.

38. A fuel cell system comprising:
N fuel cell stacks connected in parallel, each of said N stacks supplying a current for a load;
a plurality of inputs and outputs that are associated with each of said N stacks; and
a controller that produces a desired current through said load by sequentially selecting M ones of said N stacks based on a predetermined sequence and adjusting at least one parameter affecting at least one of said inputs and outputs associated with said selected ones of said N stacks,
wherein N and M are integers greater than one and M is less than or equal to N.

* * * * *